Sept. 15, 1931.    J. W. DAVIS ET AL    1,823,388
LIQUEFACTION APPARATUS
Filed Dec. 29, 1923    7 Sheets-Sheet 1

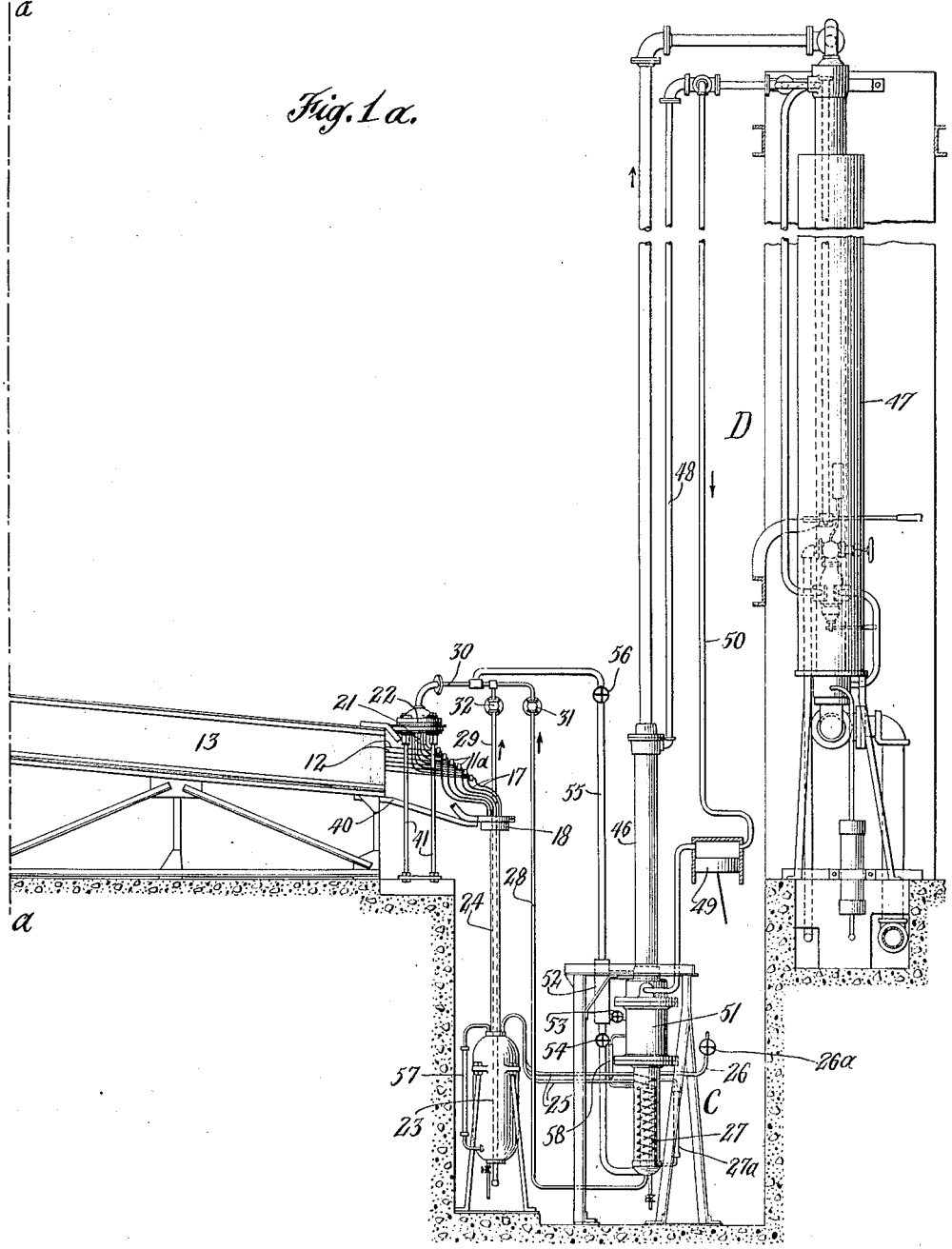

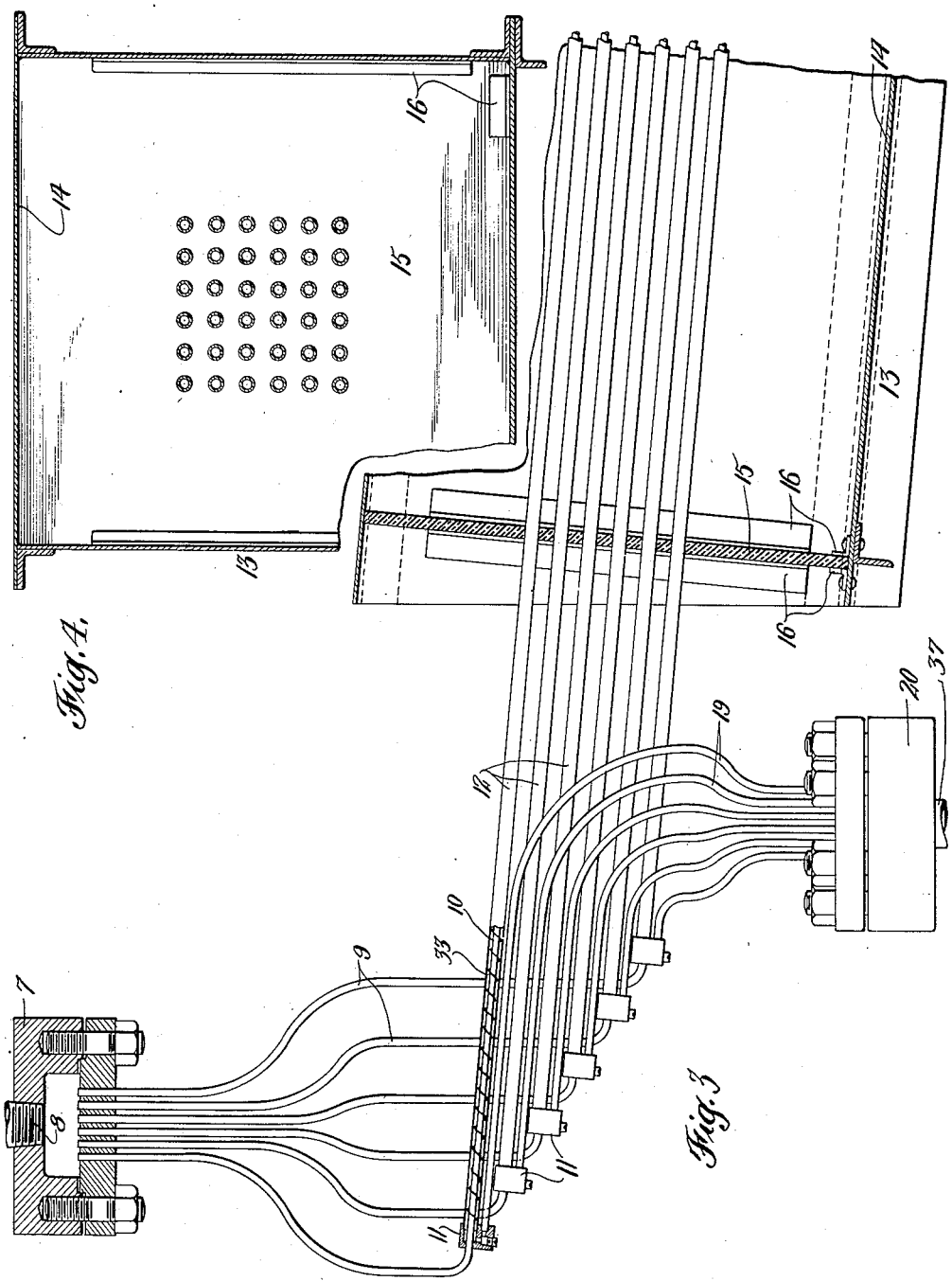

Sept. 15, 1931.    J. W. DAVIS ET AL    1,823,388
LIQUEFACTION APPARATUS
Filed Dec. 29, 1923    7 Sheets-Sheet 4
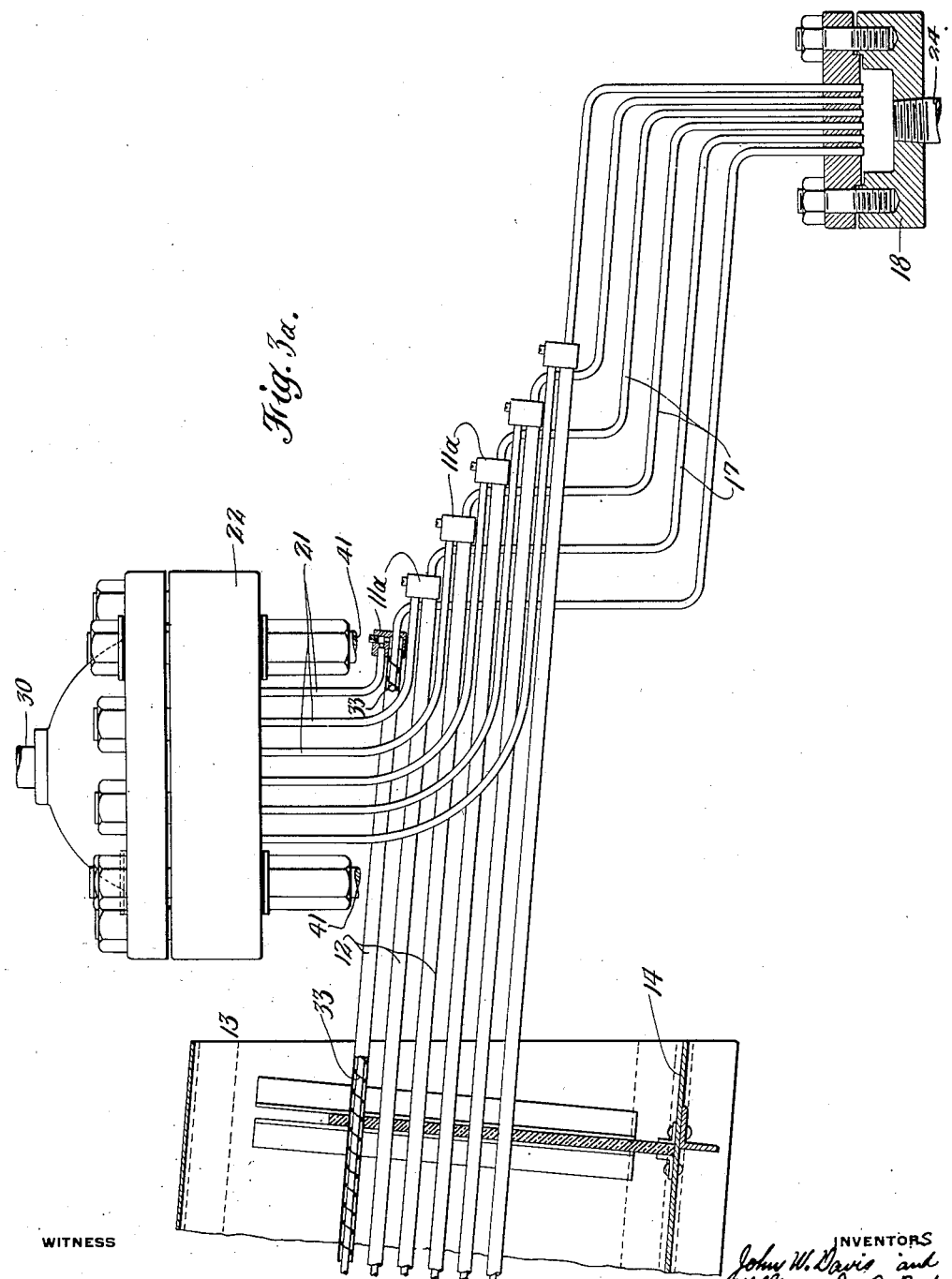

Sept. 15, 1931.  J. W. DAVIS ET AL  1,823,388
LIQUEFACTION APPARATUS
Filed Dec. 29, 1923  7 Sheets-Sheet 5

WITNESS
Gustav Genzlinger.

INVENTORS
John W. Davis and
William L. DeBaufre
BY
Synnestvedt & Lechner
ATTORNEYS Sept. 15, 1931. J. W. DAVIS ET AL 1,823,388
LIQUEFACTION APPARATUS
Filed Dec. 29, 1923 7 Sheets-Sheet 6
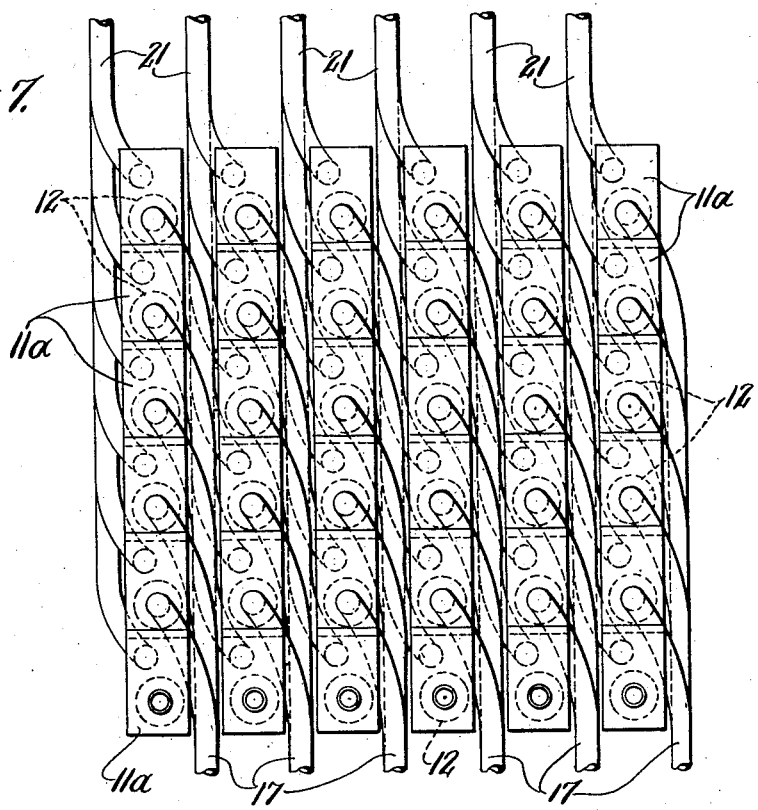
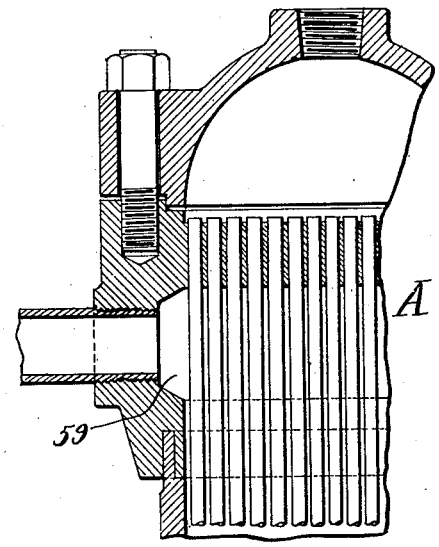

Sept. 15, 1931.  J. W. DAVIS ET AL  1,823,388
LIQUEFACTION APPARATUS
Filed Dec. 29, 1923  7 Sheets-Sheet 7

WITNESS:
Gustav Genzlinger

INVENTORS
John W. Davis and
William L. DeBaufre
BY Synnestvedt + Lechner
ATTORNEYS Patented Sept. 15, 1931

1,823,388

UNITED STATES PATENT OFFICE

JOHN W. DAVIS, OF WASHINGTON, DISTRICT OF COLUMBIA, AND WILLIAM L. DE BAUFRE, OF LINCOLN, NEBRASKA

LIQUEFACTION APPARATUS

Application filed December 29, 1923. Serial No. 683,273.

This invention relates to the art of liquefaction and it is especially useful in connection with the extraction of helium from helium bearing gaseous mixtures, or to other substances which constitute but a relatively small proportion of the gaseous mixture. While the invention is useful in the separation of other elements or substances, we will describe it in connection with the extraction of helium from a gaseous mixture such as the Petrolia, Texas, natural gas. These gases contain a little less than 1 percent of helium.

One of the primary objects of our invention is to obtain maximum efficiency not only by reducing thermo-dynamic losses to a minimum but also by reducing the expenditure of power necessary.

Still another object is to obtain a maximum yield; and to approach as closely as possible, reversibility in the gas circuit or cycle.

Another object is to obtain an efficient and simple control of conditions in the liquefaction cycle.

Our invention also contemplates an improved arrangement of parts whereby accessibility is obtained; freedom for expansion and contraction provided; as well as other features and advantages which will hereinafter more fully appear.

How the foregoing together with such other objects as may hereinafter appear, or are incident to our invention, are obtained, is illustrated in preferred form in the accompanying drawings wherein;

Figs. 1 and 1a are a side elevation of the apparatus;

Figs. 3 and 3a are a longitudinal section through the liquefier of our invention, drawn on an enlarged scale;

Fig. 4 is a transverse section through such liquefier, with certain of the tubes omitted because of the smallness of the illustration;

Figure 1:
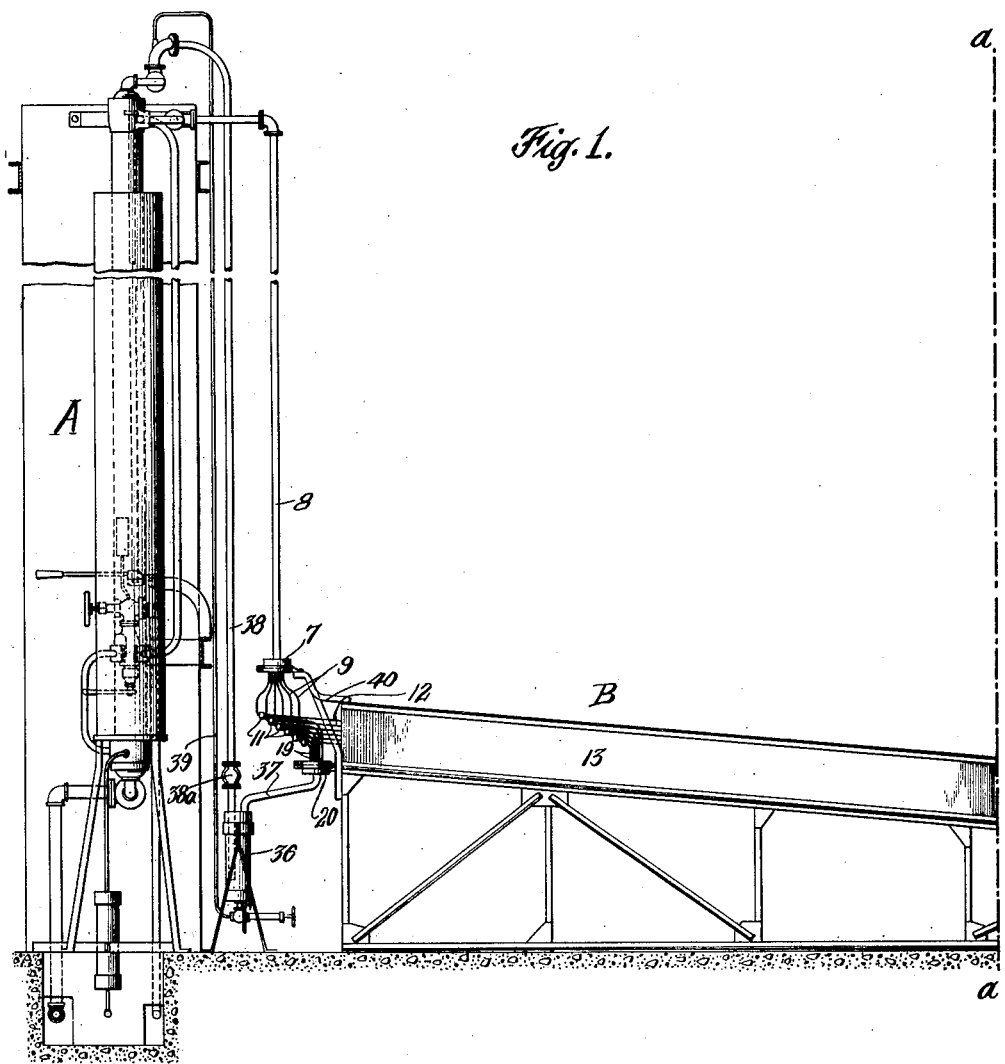
Figure 2:
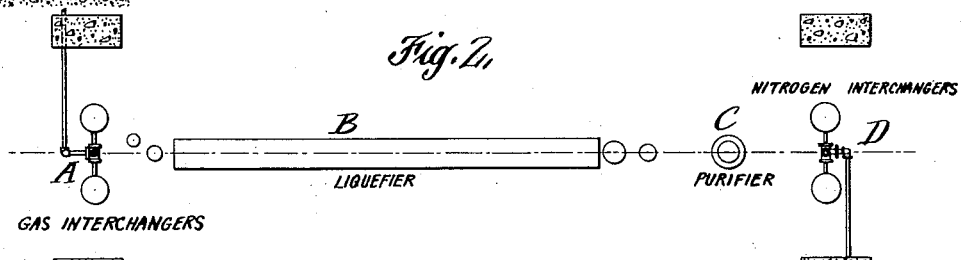
Fig. 2 is a diagrammatic top plan of the apparatus, drawn on a small scale.
Figure 5:
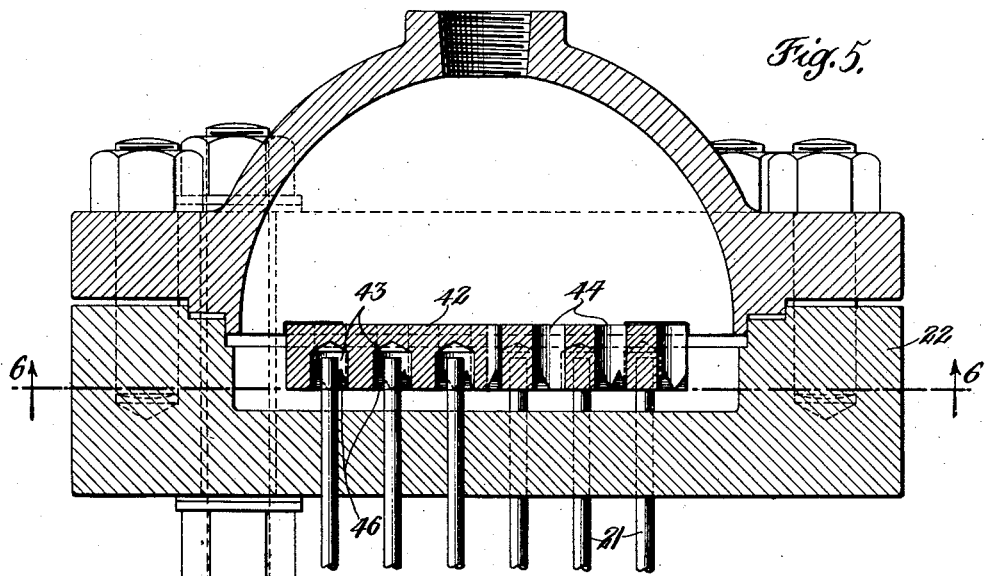
Figure 6:
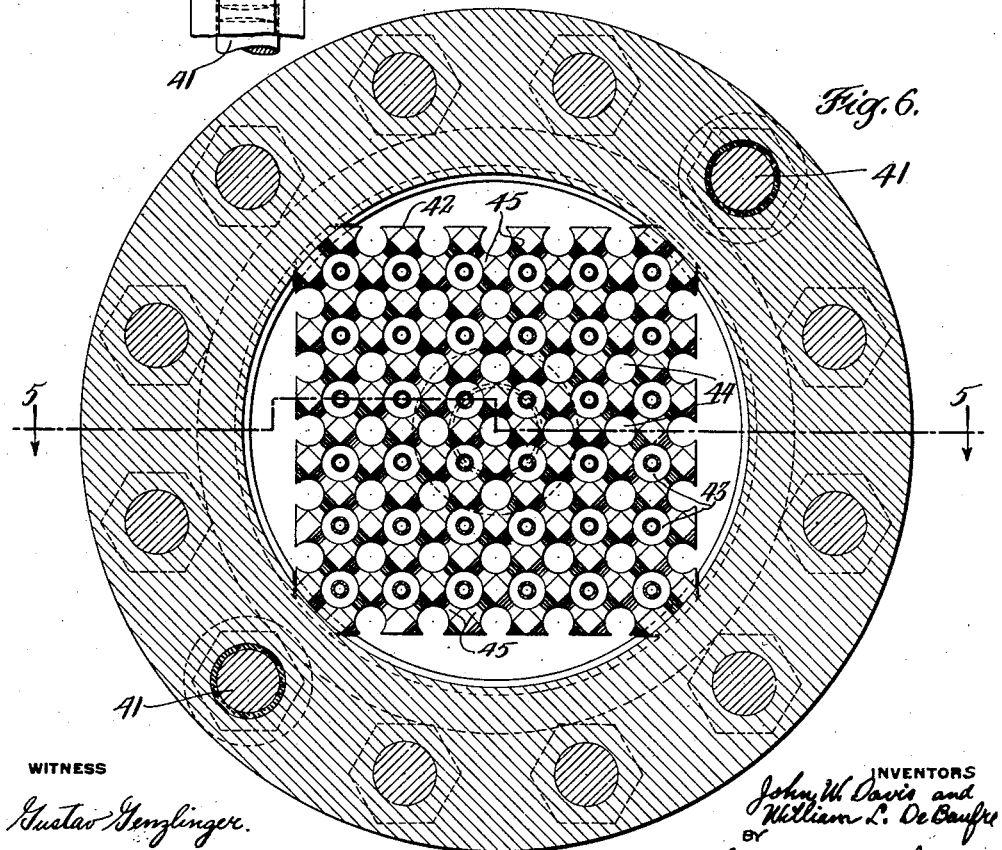
Figure 9:
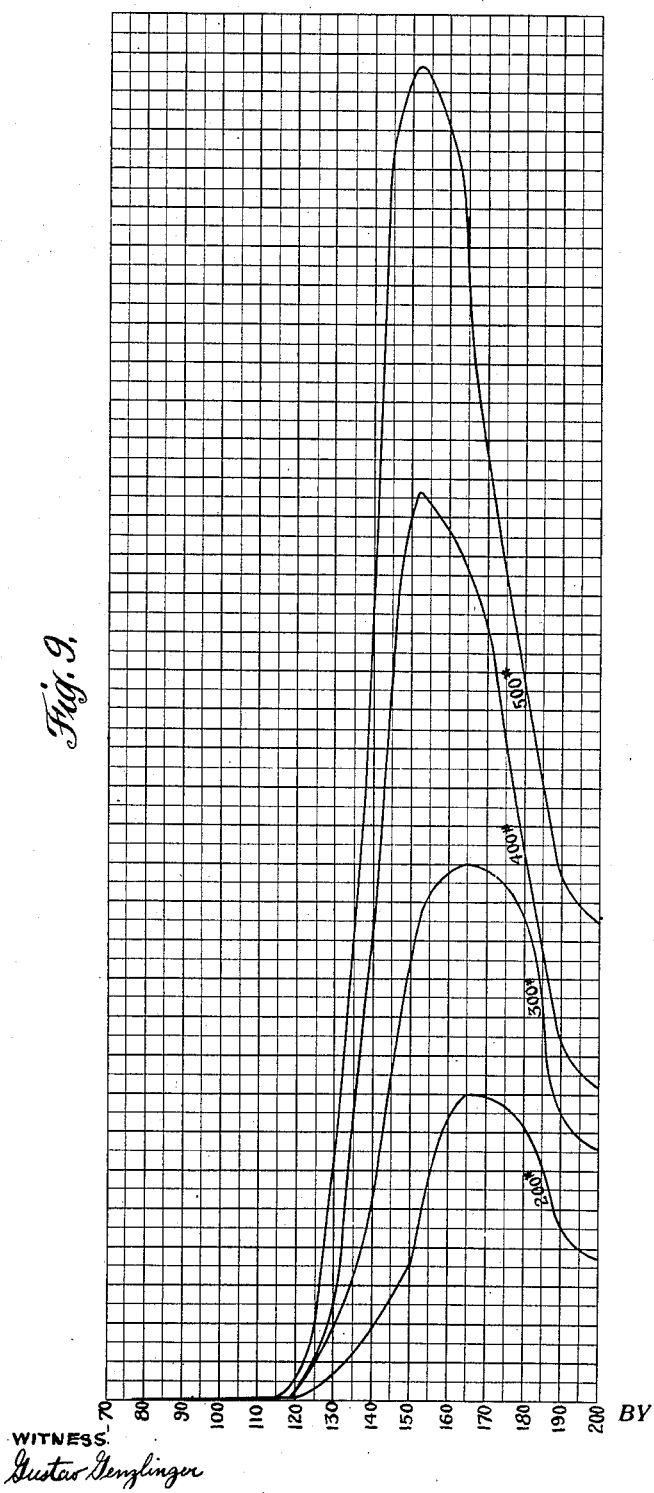
Figure 10:
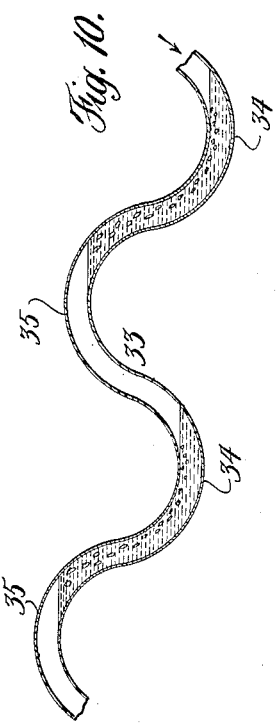

Figs. 5 and 6 are sectional views taken on the lines 5—5 and 6—6 of the figures respectively, illustrating one means which we provide for securing a uniform and even distribution of fluid in the liquefier tubes;

Fig. 7 is an end elevation of Fig. 3a illustrating certain details of the invention;

Fig. 8 is a fragmentary section illustrating an improved feature of the interchanger mechanism;

Fig. 9 is a curve illustrating the solubility of helium in the liquids condensed; and Fig. 10 is a development of an important feature of our invention.

In practicing our invention we prefer to lead the gaseous mixture to a heat exchanging mechanism such as the interchangers A, at a pressure of from about 200 pounds to about 500 pounds, depending upon the yield and purity of product desired. The interchangers, except for the features hereinafter set forth, may be of any approved design, there being two units, as usual, through which the flow may be alternated in case of freezing or plugging. The downcoming stream is cooled in the interchangers to approximately the dewpoint, when it is introduced into a substantially horizontally disposed liquefier B, in which the major liquefaction of the undesired constituents is accomplished with approximately the minimum theoretical drop in temperature required and at a pressure the same, save for the slight internal drop due to friction losses. We prefer to remove the liquids condensed and the remaining uncondensed portions of the downcoming stream from the liquefier, so that separation thereof may take place under the favorable conditions to be hereinafter set forth. The remaining uncondensed portions thus separated, are led to a purifier C in which the remaining undesired constituents are liquefied and separated, the refrigerant for the purifier being provided by an external cycle of refrigeration D. The liquids condensed in the major liquefaction and in the purification are returned to the liquefier, under independent control, and furnish the refrigeration necessary in the internal or gas cycle. The returning fluids are introduced into the liquefier in counter flow, at substantially the relatively small drop in pressure which is theoretically necessary to secure the requisite heat transfer from the downcoming to the returning streams, say for example a 50 pound drop. The return vapors leave the interchangers A at about this drop from the pressure of the entering downcoming fluid.

More specifically considering the process and apparatus, the downcoming gas, cooled substantially to the dew point, is led from the interchangers A by the pipe 8 to the manifold 7, in which it is distributed substantially uniformly to the connecting tubes 9 each of which is connected to a downcomer tube 10 of the liquefier, there being 36 of such downcomer tubes shown. There is an individual header or junction block 11 for the liquefier tubes and the downcoming fluid is conducted by the connections 9 and the tubes 10 through such headers i. e. without communication with the interior of such headers. As shown in Fig. 3 the connections 9 are, in effect, continuations of the tubes 10, but it will be understood that they may be separate members. They are shown as single members, as a leak proof arrangement may be thus better obtained.

Each downcomer tube is surrounded by a return tube 12 opening into the interior or cavity of the respective headers or junction blocks 11.

The liquefier tubes are slightly inclined from the horizontal and pass through the casing 13 of the liquefier, such casing constituting in effect, a long box open at the top, the open top side being closed by the removable cover plate 14. The return tubes are mounted in suitably spaced plates 15 which are entered through the open side of the box and removably positioned by the angles 16, as shown in Fig. 3. The plates 15 are preferably composed of suitable insulating material and the end plates constitute the end closures of the box. The box is filled with suitable insulating material entirely surrounding the tubes.

The liquefier tubes pass out of the low end of the liquefier casing and the return tubes have, at their lower ends, headers or junction blocks 11a of the construction previously described, such headers however being upside down with reference to the headers 11. The downcomer tubes each have a connection 17 leading to a manifold 18. As before the downcomer tubes 10 and the connection 17 conduct downcoming fluids through the headers 11a without communication with the interior of such headers.

From each header 11 a connection 19 leads downwardly to a manifold 20, the connection 19 communicating with the interior or cavities of the respective headers 11, i. e. returning fluids pass from the return tubes through the headers into the connections 19 and from them into the manifold 20.

To each header 11a there is a connection 21 leading from a distributor manifold 22.

The return tubes are all of substantially the same length and they are arranged in rows in rectangular form as shown in Fig. 4, with the transverse rows disposed in stepped relation. By this arrangement it is possible to have each individual header accessible, as the connections 19, 17 and 21 may be led through the spaces between the vertical rows of tubes. At the same time a compact arrangement of the liquefier tubes is possible. Since accessibility and tight joints are of great importance in this art, the advantages incident to this arrangement will be readily appreciated by those skilled in the art.

The downcoming fluid entering the downcomer tubes of the liquefier from the manifold 7 flows towards the low end of the liquefier and the major portions of the undesired constituents are liquefied therein. By virtue of the inclination of the tubes and also by virtue of the fact that the tubes have an internal diameter which is comparatively very small, the liquid, as it condenses, forms slugs at comparatively close intervals, said slugs of liquid serving as traps for entrapping the vapor or gas, causing the vapor and liquid to move together in substantial phase equilibrium. The formation of these slugs, keeps the liquid and vapor in intimate contact with one another and secures a substantial uniformity in composition throughout the length of the downcomer tubes. In this connection, we have discovered that if the tubes are made small enough, the formation of these slugs of liquid will result.

There are a number of advantages arising out of thus causing the downcoming stream to traverse the downcomer tubes with the liquids and the vapors in phase equilibrium and with substantial uniformity in composition throughout the lengths of the tubes. There are certain losses in thermo-dynamic efficiency which cannot be avoided, such for example as a certain amount of heat leak into the system and the loss in transfer of heat thru intervening metallic surfaces. Other thermo-dynamic losses may be avoided to an extent making the internal cycle for all practical purposes, reversible. If the returning stream and the downcoming stream of fluid do not have their respective vapors and liquids in phase equilibrium, there is thermo-dynamic loss. The downcoming stream should be subjected to a return stream of essentially the same composition also, if loss in thermo-dynamic efficiency is to be avoided. By the arrangement described phase equilibrium and substantial constancy of composition are obtained in the downcomer tubes and how this is obtained in the return tubes will be later pointed out.

Instead of effecting separation of the major portions of the undesired constituents which have been liquefied from the remaining uncondensed gas, in the liquefier, we prefer to effect this separation exterior of the liquefier and to this end the condensed portions and the uncondensed gas are led out of the downcomer tubes together into the manifold 18 from whence they are conducted to the liquefier pot 23 by the pipe 24. The advantage of this is that such pot can be made of relatively large volume so that the velocity therein will be very slow, which will permit the vapors to be drawn off with less liquid carried in suspension therein, i. e. in drier form. This tends toward purity of product. Furthermore, the large volume liquefier pot can be utilized as a storage for refrigerant to be called upon as conditions in the internal or gas circuit may require.

It will be noted that the connections 9 lead downwardly to the downcomer tubes so that should there be any liquids formed in the interchanger, these will be assisted by gravity to enter the downcomer tubes along with the vapors. The connections 17 also lead downwardly from the headers 11a and the liquefier pot is located beneath the manifold, so that here again gravity assists in causing the liquids to flow into the liquefier pot and out of the downcomer tubes.

The vapors in the upper portion of the liquefier pot 23 are conducted to the purifier by means of the pipes 25 and as will be further pointed out, the remaining undesired constituents are liquefied in the purifier, the product—helium of about 95 percent purity—being drawn off through the pipe 26.

The liquids condensed and collecting in the purifier pot 27, located within the lower portion of the purifier, and the liquids collecting in the liquefier pot 23 are respectively returned to the distributor manifold 22 by means of the pipes 28 and 29 and the pipe 30, under independent control afforded by the throttles 31 and 32. As before indicated they are returned at a drop in pressure of about 50 pounds, i. e. the drop in pressure required to secure the difference in temperature necessary to obtain the heat transfer from the downcoming to the returning streams through the intervening metallic surfaces. The construction of the distributor manifold will be hereinafter described. At this point it will suffice to point out that the liquids, together with any vapor which might form as an incident to the throttling, are uniformly distributed amongst the connections 21 so as to secure uniform distribution amongst the return pipes or tubes 12. The liquids entering the low end of the return tubes are caused to take a spiral course therethrough for reasons which will now be set forth.

A helix of wire 33 is arranged in the space between the downcomer and the return tube walls. This helix is composed of wire having a thickness or diameter substantially equal to the distance between the walls of the outer and inner tubes and the wire is brazed to both tubes. The liquids and vapors can therefore only travel in the spiral channel which is necessarily formed by this arrangement. The liquids on entering begin to boil off and vapors form, but the low portions of the spiral channel fill with slugs of liquid entrapping the vapor therebetween. This is shown in the development of Fig. 10. The low points in the spiral channel are indicated at 34 and the high points at 35. The slugs of liquid accumulate and form in the low portions and entrap the vapor being boiled off, and as the pressure of the vapor rises in the high points by virtue of the continual boiling off, the slugs are displaced as shown, until the slugs are shot over the high points to the next low point and so on throughout the length of the return tubes. As part of the slugs are vaporized, the bubbles of vapor formed will rise through the slugs to the vapor space at the next high point, as indicated in the figure, and so on throughout the return tubes.

In consequence, the liquids and vapors are caused to return together in intimate contact and in substantial phase equilibrium, and also with substantial uniformity or constancy of composition from one end of the return tubes to the other. We thus secure the subjection of the downcoming stream having its liquids and vapors in phase equilibrium to a returning stream having its liquids and vapors in phase equilibrium. The returning fluid is also of substantially the same composition as the downcoming fluid. Thus the advantages hereinbefore noted are obtained.

Furthermore this arrangement is such as to cause high boiling point liquids to continually move to progressively warmer portions of the circuit. Heretofore, high boiling point liquids have been a source of great trouble in liquefaction systems, particularly where the gaseous mixtures being liquefied contain hydro-carbons. Such high boiling point liquids would simply accumulate because they would not boil off, with the result that in time they would detrimentally warm up the system. By our arrangement they are caused to move along with the other liquids to progressively warmer portions of the liquefier where they are vaporized.

The vapors of the return tubes are led from the headers 11 by the connections 19 downwardly to the manifold 20, the connections 19 being led downwardly so that should there be any liquid returning with the vapors clear to the upper ends of the return tubes (as might be the case where there was excess refrigeration or as might be the case if high boiling point liquids are not completely evaporated within the tubes), such liquid will be carried by gravity into the manifold 20 and from thence into the pot 36 by means of the pipe 37.

From the pot 36 the return fluids are returned to the interchangers in counter-flow with the downcoming stream. If there are no liquids returned to the pot 36, the vapors will flow upwardly through the pipe 38 to the interchangers, and should liquids, such as high boiling point liquids, accumulate in the pot 36 they will cover the lower end of the pipe 38 which, it will be observed, has its lower end opening well into the bottom portion of the pot. The vapor above accumulated liquids will bubble through the liquid and entrain portions thereof, forcing the same upwardly through the pipes 38. As an additional emergency means for this purpose we provide the very small pipe 39 opening from the very bottom of the pot 36, which pipe operates to lift liquids to the interchanger by the pressure difference which may be produced by partly closing the valve 38a. The interchangers are, of course, sufficiently warm to vaporize any high boiling point liquids.

In connection with the formation of slugs in the spiral channel in the return tubes, it will be noted that the inclination of the tubes is such that the accumulations described may form; and also that the liquids and vapors returning, travel together with substantial phase equilibrium and with substantial constancy in composition from end to end, up hill. At no point, either in the manifolds or tubes will there be a stagnant accumulation of liquids. It will also be noted that the tubes 10 and 12 are supported for freedom of expansion and contraction in the liquefier casing and that the flexible connections 9, 19, 17 and 21 readily accommodate themselves to such expansion and contraction. The liability of the development of leaks is thus minimized. The supporting brackets 40 for the manifolds are preferably removable and are primarily intended to permit of shipment of the liquefier as a unit. When the apparatus is completely assembled such brackets may be dispensed with.

Coming now to the distributor manifold 22, attention is directed particularly to Figs. 5 and 6. Since this manifold receives the liquids which are to be returned through the liquefier, it will be apparent that there should be an even distribution of such liquids to the return tubes. Ordinarily we have found that if this manifold is properly leveled as by means of the adjusting bolts 41, effective distribution amongst the connections 21 and, therefore, amongst the return tubes 12, will be obtained if the upper ends of the tubes 21 be extended upwardly a short distance into the interior of the manifold, with the ends all lying in the same horizontal plane. The entering liquids will accumulate and well up over the ends of the connections 21. As an additional means for securing distribution we may provide a distributor plate 42 provided in its lower face with a plurality of recesses 43 into which the upper ends of the connections 21 extend part way. Vertical holes or apertures 44 are provided and the entering liquids fall upon the plates, and flow over the edges thereof and downward through the apertures 44. The lower face of the plate is provided with grooves 45 extending diagonally across the plate in both directions. These grooves merge into the recesses 43 providing weir-like openings 46, the net effect of the distributor plate being to cause the liquids and vapor that may be formed to flow into the connections 21 equally and with substantially the same ratio of vapor to liquid.

It will be noted that we have not abstracted or removed any portion of the down-coming stream (vapor or liquid) during liquefaction in the liquefier; nor have we abstracted any portion of the returning fluid (liquid or vapor) in other words the composition of the downcoming and returning streams in the internal cycle are, respectively, unchanged throughout the cycle. The advantage of this will be clear from the following: While heretofore it has been assumed that thermodynamic inefficiency has been largely attributable to heat leaks into the system, this is not the case and such losses and also the loss incident to the actual tranfer of heat through intervening metallic surfaces may be reduced to comparatively small values. The actual source of great loss in efficiency has been due to the fact that heretofore, particularly in the extraction of helium, liquids have been abstracted as formed with the result that the composition of the downcoming stream was continually changing, and similarly abstraction of liquids, particularly high boiling point liquids, was made on the return side, so that the composition of the returning fluid was changed. For any given composition of gaseous mixture, at a given pressure, there is a theoretical drop in temperature from the dew point to the point at which major liquefaction is accomplished which drop, however, is comparatively slight, although there is a large abstraction of heat. Similarly a liquid of given composition at a given pressure may be boiled off or evaporated with a minimum rise in temperature. Therefore if the composition of the downcoming stream remains the same, it will be seen that major liquefaction can be accomplished with approximately minimum theoretical drop in temperature; and that boiling off of the return fluid, if its composition remains substantially constant, can be brought about with a minimum rise in temperature, closely approximating the theoretical. The foregoing is especially made possible if the composition of the downcoming stream is substantially constant throughout all portions on the downcoming side and the composition of the returning fluid remains substantially constant throughout the return side of the system, with the vapors and liquids of both downcoming and returning streams in substantial phase equilibrium, respectively; and where, as here, the composition of the returning fluid is essentially the same as the composition of the downcoming stream.

It will be seen, therefore, that we are enabled to accomplish the major liquefaction of the undesired portion of the gaseous mixture with a minimum drop in temperature throughout the cycle, closely approximating the theoretical, and therefore with a minimum expenditure of power. If now we plot the temperature curve with temperature on the left and heat abstracted at the base, the portion of the curve representing the cooling down of the incoming gas in the interchangers to approximately the dew point will be comparatively steep, with considerable heat abstracted, while the portion representing the condensing from the dew point until major liquefaction is accomplished, will be comparatively flat, with very little drop in temperature but with the abstraction of a relatively large amount of heat. The curve of the returning fluid will be substantially parallel to the curve of the downcoming portion, but at a temperature just low enough throughout the cycle to secure the heat transfer through the metallic surfaces, the drop being quite close to the theoretical mean value.

If substantial phase equilibrium and constancy of composition are not maintained in the downcoming and returning streams, the heat temperature curves will not be substantially parallel to each other, and in order to obtain the same mean temperature difference requisite to heat transfer, there will be large differences in temperature at certain points, requiring correspondingly large pressure differences with consequent losses of power.

The flatness of the liquefaction portion of the curve will be clear from our preferred practice in which the gas enters the liquefier at approximately the dew point, while the temperature in the liquefier pot, where the liquids are separated from the uncondensed gas, is approximately $-120°$ C.

For purification there is a large drop in temperature with comparatively very little abstraction of heat, indeed, so this portion of the curve is very steep, in fact much steeper than the curve of the cooling in the interchangers. In preferred practice, we have a temperature of approximately $-190°$ C. in the purifier pot where the remaining undesired constituents in liquid form are separated from the product in practically pure form. This large drop in temperature is obtained by the refrigerating effect of the external cycle. It will thus be seen that the losses due to heat leaks and to securing actual heat transfer in the internal cycle are compensated for by the refrigeration made available by the external cycle in purifying the product.

The advantage of separating the liquid produced in major liquefaction from the remaining uncondensed gas and of separating the remaining undesired constituents liquefied in the purifier from the product at the temperatures, respectively above indicated, will be clear from the following. Referring to Fig. 9 which shows the solubility of helium in the liquid condensed at various pressures, it will be seen that the solubility increases as the temperature becomes lower until a certain critical temperature is reached, whereupon the solubility decreases with a further drop in temperature. It has recently become known to others and ourselves that at definite pressures, the solubility of helium increased with decreasing temperatures, but we have further discovered that there is such a critical temperature as above indicated and that at temperatures below which the solubility decreases. From an analysis of this curve it will be seen by effecting separation of the liquids condensed in major liquefaction from the remaining uncondensed portions of the mixture at approximately $-120°$ C. the solubility of the helium in the liquids condensed is practically negligible. Similarly if the remaining undesired liquefied constituents be separated from the practically pure product in the purifier at a temperature of approximately $-190°$ C. the solubility of the helium in the liquids condensed is at a minimum. In accordance with our invention, therefore, we separate the liquids and vapor of major liquefaction at a temperature above the critical temperature for the particular pressure and mixture at which solubility of the product in the liquids condensed is at a maximum; and we separate the liquids produced in purification from the practically pure product below the critical temperature at which the solubility of the product in the liquids condensed is at a maximum. The importance of this will be readily perceived when it is considered that the product desired constitutes but a small fractional part of the gaseous mixture being processed.

The purifier and the external cycle of refrigeration will not be fully described as the same form the basis of a co-pending application Serial No. 683,274, filed December 29, 1923 and only such portions thereof will be described as are necessary to an understanding of certain features of the present invention now to be set forth.

Nitrogen at a high pressure, produced by compressors, (not shown) is led into the interchangers 47, which may be of any desired construction, and is there cooled in counterflow with the returning stream of the external cycle, the cooled gas leaving the interchangers and dividing, part entering the top of the purifier through the pipe 48 and part being led to an expansion engine 49 by the pipe 50. That portion of the high pressure nitrogen entering through pipe 48 is liquefied, throttled to get lower temperature and introduced into the intermediate or gas space or section 51 of the purifier, into which section the exhaust of the expansion engine 49 may also be led. The liquid drops to the bottom of the purifier casing immersing the purifier pot 27 and the coils of the pipes 25 thereabout. The temperature is preferably in the neighborhood of $-190°$ C. or below. The gases drawn off from the liquefier pot 23 are cooled by the evaporation of the liquid in the bottom of the purifier casing and the remaining undesired constituents are liquefied and collected in the purifier pot 27, practically pure helium being drawn off at the pipe 26.

The high pressure nitrogen liquefied in the upper portion 46 of the purifier casing is introduced into the gas space 51 through the manifold 52, the throttling hereinbefore referred to being accomplished by the throttle 53. This manifold also has a branch leading to the bottom of the purifier casing, such branch being controlled by the throttle 54. A connection 55 leads from the upper portion of the manifold 52 to the pipe 30, such connection being controlled by the throttle 56. By this arrangement the following advantages may be secured.

By closing throttles 53 and 54, the high pressure nitrogen which has been liquefied in the external cycle may be by-passed through the internal or gas circuit through the connection 55 and throttle 56, thereby serving to cool down the internal cycle in starting operations, preparatory to introducing the downcoming stream. It also prevents freezing in the liquefier and purifier during the start up. By proper manipulation of the throttles 53 and 56, extra refrigeration can be thrown into the internal cycle. Furthermore, the arrangement makes it possible to overcome difficulties that might arise where the nitrogen in the external cycle is impure, for in this case the nitrogen liquefied in the upper part 46 of the purifier will contain a greater percentage of high boiling point liquids than in the impure nitrogen supplied to the refrigeration cycle. By discharging some of this liquefied impure nitrogen into the gas cycle through pipe 55 and valve 56, the relative percentage of impurities in the refrigeration cycle is reduced. In regular operation when the refrigerating fluid of the external cycle is pure or where the impurities of such a fluid boil at practically the same temperature as the main body of the refrigerating fluid, the high pressure liquid may be led into the purifier through the throttle 53. In other cases, in order to prevent double fractionation, we prefer to lead the high pressure liquids into the bottom of the purifier casing through the throttle 54. The arrangements afford great flexibility.

The liquefier pot 23 and the purifier pot 27 are provided with gauges 57 and 27a diagrammatically shown. We have discovered that the amount of the product of the processed gas in the system has an important bearing on operating conditions, in fact so much so that we prefer to control internal conditions through regulation of the rate of withdrawal of the product from the system. The gauges indicate the respective volumes of the liquid and vapor in the pots and the gauge 27a indicates the volume of liquid and the volume of the product in the pot 27. If the liquid rises in such pot, the product is being withdrawn at too great a rate in comparison with the rate of supply of the raw gas, a condition which may be remedied either by partly closing valve 26a in the helium outlet pipe 26 or by increasing the supply of raw gas to the system. If the liquid falls, the product is accumulating in the system, a condition which may be remedied either by decreasing the rate of supply of raw gas or by increasing the rate of withdrawal of the product. Gauges of this character we believe have never been employed in liquefaction apparatus of this character. In first operation, we permit an accumulation of liquid in both the liquefier and the purifier pots, to store refrigeration for use in case conditions should be upset and, thereafter, in regular operation the liquids are returned to the internal cycle at the same rate as condensed, with only the reduction in pressure necessary to secure the difference in temperature required to effect transfer of heat through the intervening metal surfaces. By virtue of the extreme efficiency of the system, the reduction in pressure and the difference in temperature between the downcoming and the return streams is very close to the theoretical minimum. Since the external cycle produces the refrigeration compensating for the heat leaks into the system and the losses incident to actual heat transfer, the use of the liquid formed in the liquefier pot affords a control of operating conditions in the internal cycle so effective as to make it seldom necessary to adjust the throttle 32, once the system has settled down. Since other losses are comparatively negligible because of the high efficiency of the system, it will be seen that the expenditure of power in the external cycle is at a minimum, and no external work is performed save at the point where it can be effectively applied.

Referring now to Fig. 8, it will be observed that at the point where the cooled gases of the downcoming stream are taken off from the interchanger, the interchanger is annularly enlarged as at 59 so that there is a wide distribution of flow, instead of a localized flow between several tubes, and hence the liability of plugging of the offtake is avoided. The level of liquid in the bottom of the purifier is indicated by the gauge 58.

In the processes heretofore used—particularly those employed for the extraction of helium—the interchangers and also the rectifiers would handle only the particular composition of gas to be processed and if this varied the apparatus would become disorganized.

We propose to operate in such manner as to produce helium of substantially the same purity irrespective of the composition of the gas to be processed and we are enabled to do this by virtue of the fact that our liquefier functions approximately equally well as an interchanger and makes up for any deficiencies of the interchangers due to variations or differences in composition of the gas. This is attributable, among other things, to the fact that the smallness of the downcomer tubes of the liquefier and the smallness of the space between the downcomer and return tubes are such that turbulent flow of gases takes place therethrough in the event that the liquefier has to function as an interchanger as well. Stated in other words, this smallness, although provided for the other purposes herein set forth can be availed of to make the liquefier function as an interchanger if the tubes of the liquefier bear such relation to the interchanger that the high mass flow of gases will result in the warmer end of the liquefier. To this end, we employ less tubes in the liquefier than in the interchanger so that the liquefier tubes—when functioning as an interchanger—will have a relatively large volume of gases to handle which will produce the desired turbulence of flow. We also make the liquefier longer than would be in reality required for liquefaction if a gas of a given composition only were to be handled and make the interchangers of a length suitable for that composition. If now the composition varies, and the operation of the interchangers is deficient, the warm end of the liquefier will act as an interchanger, cooling the fluid to the desired point after which liquefaction will follow in regular course, with helium of substantially the same purity as the product. The lengthening of the liquefier does not interfere with its normal functioning.

I claim:

1. In the art of liquefaction, a liquefier casing and a bank of tubes extending therein rectangularly arranged, the tubes being of substantially the same length and arranged in rows, the rows being arranged in stepped relation and a connection header for each tube, the ends of the tubes extending beyond the casing.

2. In the art of liquefaction, a liquefier including a plurality of return tubes, a plurality of downcomer tubes within the return tubes, and a header at each end of each return tube through which the downcoming fluid and the return fluid are independently led.

3. In the art of liquefaction, a liquefier including a plurality of return tubes, a plurality of downcomer tubes within the return tubes, and a header at each end of each return tube through which the downcoming fluid and the return fluid are independently led, together with a manifold and a tube connecting each header at one end of the return tubes with the manifold.

4. In the art of liquefaction, a liquefier including a plurality of return tubes, a plurality of downcomer tubes within the return tubes, and a header at each end of each return tube through which the downcoming fluid and the return fluid are independently led, together with a manifold and a tube connecting each header at one end of the return tubes with the manifold, the return tubes being so arranged that said last tubes may be led therebetween.

5. In the art of liquefaction, a liquefier having a pair of manifolds at each end, a plurality of return tubes, a plurality of downcomer tubes within the return tubes, and means whereby the downcomer tubes are connected at each end with a manifold at each end of the liquefier and the return tubes are connected at each end with a manifold at each end of the liquefier for independent flow of downcoming and returning fluids.

6. In the art of liquefaction, a liquefier casing having independent flow downcomer and return tubes, appropriate fixed manifold means at each end of the tubes and outside the casing, and flexible flow connecting portions between manifold means and tubes affording freedom for expansion and contraction.

7. In the art of liquefaction, a liquefier having downcomer tubes and return tubes within which the downcomer tubes pass, appropriate manifold means at each end, connections between the manifold means and the tubes, led through the spaces between return tubes.

8. In the art of liquefaction, a liquefier having downcomer tubes and return tubes within which the downcomer tubes pass, header means through which the downcoming and returning fluids are independently led, and connections communicating with the return tubes in such header means.

9. In the art of liquefaction, an interchanger, a liquefier through which the downcoming fluid is passed and condensed fluid returned, and a pot between the intake end of the liquefier and the interchanger adapted to receive the returning fluid before return through the interchanger, together with means for returning vapor and any liquid in said pot together to the interchanger.

10. In the art of liquefaction, an interchanger having tubes and an offtake for the downcoming fluid, the interchanger being enlarged at the point of offtake short of the tube ends whereby plugging around the tubes at the offtake point is prevented.

11. In the art of liquefaction, a substantially horizontal liquefier having downcomer and return tubes, a pair of manifolds at each end, a connection leading downwardly from a manifold to each downcomer tube at the intake ends thereof, a connection leading downwardly from the other end of each downcomer tube to another of the manifolds, a connection leading downwardly from a third of the manifolds to each return tube at the intake ends of such tubes, and a connection leading downwardly from each return tube at the discharge ends thereof to the fourth manifold.

12. In the art of liquefaction, a liquefier having a plurality of tubes, a manifold connected to said tubes, means in the manifold for admitting a fluid to the manifold, and means for securing a flow of vapor and liquid of the fluid from the manifold to the tubes.

13. In the art of liquefaction, a liquefier having a plurality of tubes, a manifold connected to said tubes, means for admitting a fluid to the manifold, and a distributing plate in the manifold having recesses into which the ends of the connections to the tubes extend.

14. In the art of liquefaction, a liquefier having a plurality of tubes, a manifold connected to said tubes, means for admitting a fluid to the manifold, and a distributing plate having recesses into which the ends of the connections to the tubes extend said plate having grooves connecting recesses.

15. In the art of liquefaction, a liquefier having a plurality of tubes, a manifold connected to said tubes, means for admitting a fluid to the manifold, and a distributing plate having recesses into which the ends of the connections to the tubes extend, the mouths of the recesses being of weir form.

16. In the art of liquefaction, a liquefier having a plurality of tubes, a manifold connected to said tubes, means for admitting a fluid to the manifold, and a distributing plate having recesses into which the ends of the connections to the tubes extend, the plate being spaced above the bottom of the manifold.

17. In combination, an interchanger, a liquefier having a plurality of downcomer tubes, a liquid pot, and appropriate flow connections, all arranged so that downcoming fluid in entering the liquefier and in leaving the liquefier is aided by gravity.

18. In combination, an interchanger, a liquefier having a plurality of return tubes, a liquid pot, and appropriate flow connections, all arranged so that returning fluid in entering and in leaving the liquefier is aided by gravity.

19. In the art of liquefaction, a liquefier for effecting separation of gaseous mixtures by liquefaction of undesired portions, comprising substantially horizontally disposed downcomer and return tubes, means for collecting the condensed fluid, and means for dropping the pressure in the system to return the liquid condensed in counterflow.

20. In the art of liquefaction, the combination of a substantially horizontally disposed liquefier and heat exchanger at each end respectively for the internal cycle of the liquefier and for an external purification cycle.

21. In the art of liquefaction, the combination of an interchanger, a liquefier in which the major portion of the fluid not desired is condensed, a pot independent of the liquefier in which the remaining vapor is separated from the condensed portions, a purifier pot in which the liquids further condensed are separated from the constituent desired, and means for returning the liquids from the liquefier pot and the purifier pot to the return circuit of the liquefier under independent control.

22. In the art of liquefaction, the combination of an interchanger, a liquefier in which the major portion of the fluid not desired is condensed, a pot in which the remaining vapor is separated from the condensed portions, a purifier pot in which the liquids further condensed are separated from the constituent desired, and means for returning the liquids from the liquefier pot and the purifier pot to the return circuit of the liquefier under independent control.

23. In the art of liquefaction, the combination of an interchanger, a liquefier in which the major portion of the fluid not desired is condensed, a pot in which the remaining vapor is separated from the condensed portions, a purifier pot in which the liquids further condensed are separated from the constituent desired, and means for returning the liquids from the liquefier pot and the purifier pot to the return circuit of the liquefier under independent control at substantially the same rate as the liquids are formed.

24. In the art of liquefaction, the combination of an interchanger, a liquefier in which the major portion of the fluid not desired is condensed, a pot independent of the liquefier in which the remaining vapor is separated from the condensed portions, a purifier pot in which the liquids further condensed are separated from the constituent desired, and means for returning the liquids from the liquefier pot and the purifier pot to the return circuit of the liquefier at a relatively slight reduction in pressure and under independent control.

25. In the art of liquefaction, the combination of an interchanger, a liquefier in which the major portion of the fluid not desired is condensed, a pot in which the remaining vapor is separated from the condensed portions, a purifier pot in which the liquids further condensed are separated from the constituent desired, and means for returning the liquids from the liquefier pot and the purifier pot to the return circuit of the liquefier under independent control at substantially the same rate and at a relatively slight reduction in pressure as the liquids are formed.

26. Apparatus for liquefying gaseous mixtures including a gas circuit, an external refrigerating circuit employing a liquefiable refrigerant, a purifier pot, a manifold for the liquefied refrigerant connected to the gas circuit and to the gas space of the purifier pot and to the liquid space of the purifier pot, and valvular means controlling the flow in the connections.

27. In the art of liquefaction, an interchanger, a liquefier, and means for returning high boiling point liquids from the liquefier in the region of the intake end thereof to the interchanger including a pot and a connection from the liquefier thereto and a connection therefrom to the interchanger.

28. In the art of liquefaction, a liquefier and a purifier in which respectively the major portions and the remaining portions of the undesired constituents are liquefied at substantially the same pressure, and means for returning the condensed liquids to the liquefier at a relatively slight reduction in pressure.

29. In the art of liquefaction, an interchanger having tubes and an offtake for the downcoming fluid, the interchanger being annularly enlarged around the nest of tubes adjacent the point of offtake.

In testimony whereof, we have hereunto signed our names.

JOHN W. DAVIS.
WILLIAM L. DE BAUFRE.